United States Patent [19]

Van Doorn

[11] 3,733,769

[45] May 22, 1973

[54] PROCESS OF WRAPPING AND STRAPPING BALES OF FIBERS

[75] Inventor: Donald W. Van Doorn, Columbus, Ga.

[73] Assignee: Lummus Industries, Inc., Columbus, Ga.

[22] Filed: Dec. 29, 1971

[21] Appl. No.: 213,300

[52] U.S. Cl. ............................................53/24, 53/27
[51] Int. Cl. ...............................................B65b 63/02
[58] Field of Search .......................53/24, 27, 124 R, 53/124 C

[56] References Cited

UNITED STATES PATENTS

| | | | |
|---|---|---|---|
| 1,948,615 | 2/1934 | Clark | 53/24 |
| 3,380,221 | 4/1968 | Thiele | 53/24 |

Primary Examiner—Travis S. McGehee
Attorney—Hugh P. Carter and Woodford R. Thompson

[57] ABSTRACT

A time saving process of wrapping and strapping bales of fiber such as cotton, man-made fibers and the like. While the bale is held compressed in the baling apparatus such as a press, a first strap or tie is placed about the bale adjacent an end of the bale. The wrapping or bagging is tucked about the first applied tie while the remaining ties are applied starting at the opposite end of the bale. As soon as the wrapping is tucked about the first applied tie the operator tucks the wrapping about the tie which has been applied to said opposite end, allowing time for the application of the intermediate ties while the operator is tucking the bagging about said second tie, thus reducing the overall time required to secure the bale.

4 Claims, 4 Drawing Figures

INVENTOR.
Donald W. Van Doorn
BY
Jennings, Carter & Thompson
Attorneys

PROCESS OF WRAPPING AND STRAPPING BALES OF FIBERS

This invention relates to process for wrapping and strapping bales of fibers such as cotton, man-made fibers and the like and has for its principle object a process of the character indicated which results in saving time required completely to secure such bales.

In the art to which my invention relates bales of fibers such as cotton and the like are packaged by placing about them, at least on the top, bottom and ends, two sheets of material such as woven jute bagging. As the bale is formed in the press it is necessary to place straps about the ends of the bale and to tuck the bagging about such end straps, so that when the pressure is released and the bale expands, the bagging is trapped or caught under these straps. With the advent of automatic strapping machines which traverse the length of the bale and put a plurality of straps about it, it is now possible to place some eight or so straps about a bale in a relatively short time, thus to reduce the overall time that the bale has to remain in the press. However, it previously has been proposed to start placement of the straps at one end of the bale, permitting the strapping machine successively to move from that position toward the opposite end of the bale, placing straps as it moves along from station to station. Since the bagging must be tucked under or about the end straps, the operator or operators (sometimes there are two, one working one side of the bale and one the other side thereof) have to wait until the strapping apparatus makes a complete traverse of the length of the bale, before being able to tuck in the bagging at the opposite or far end of the bale from the place where the first strap is applied.

In view of the foregoing my invention contemplates a process in which a strap or straps are first applied adjacent one end of the bale, the strapping apparatus caused to move to the opposite end of the bale where a second strap or straps are applied, starting from the said opposite end and working back toward the end about which the first strap or straps were applied. In this way as soon as the first strap or straps are applied the operators may tuck the bagging under the same. They then immediately move to the opposite end where the other end strap or straps have been applied and tuck the bagging about the same while the machine is placing about the bale the intermediate straps. In this way a material amount of time is saved, speeding up the process and permitting the baling press and the strapping apparatus to be utilized at its most efficient rate of production.

A form of apparatus suitable for carrying out my improved process is shown in the accompanying drawings forming a part of this application in which.

Figure 2:
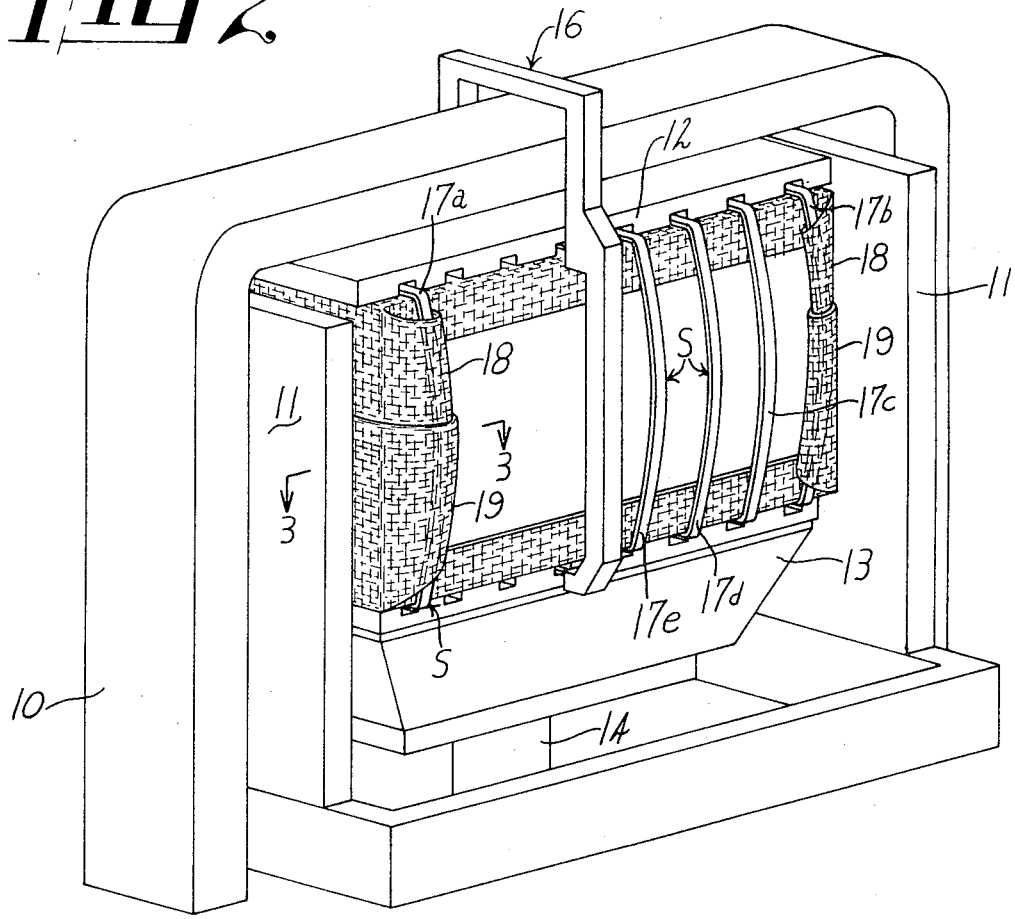
FIG. 2 is a view corresponding to FIG. 1 and showing subsequent steps in the process.
Figure 3:
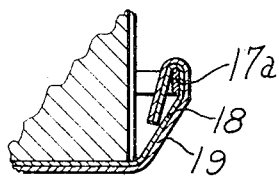
Figure 4:
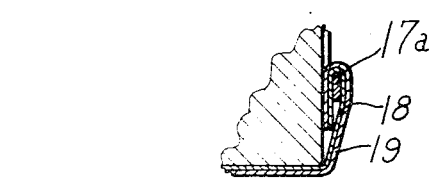

FIG. 3 is a detail fragmental view taken along line 3—3 of FIG. 2 and showing the relative position of the bagging and one of the end straps prior to removing the compressive forces on the bale; and, FIG. 4 is a detail sectional view similar to FIG. 3 and showing the relative disposition of the strap with the bagging tucked thereunder after the bale has expanded in response to release of the pressure thereon, namely, after removal from the press.

Referring now to the drawings for a better understanding of my invention I illustrate in wholly diagrammatic form a baling press which may have the usual overhead frame 10, a box having end walls 11, a top platen 12 fixed to the overhead member 10 and a platen 13 which may be moved up and down by means of a rod 14 carried by the usual hydraulic cylinder, not shown. While I illustrate my invention diagrammatically in association with an up-packing press, as the description proceeds it will be seen that the same may be employed advantageously with various forms of presses and other baling means.

At 16 I illustrate also diagrammatically a moving part of a strapping mechanism which is adapted, in the manner understood in the art, to pass straps S completely about the bale, while held in the press, the ends thereof being secured by a seal or fastening device, not shown. By way of example, a type of apparatus suitable for passing straps about the bale and for securing their ends is shown in U.S. Pat. No. 3,521,550, issued July 21, 1970, "BALE STRAPPING APPARATUS." Suffice it here to say that the mechanism 16 is capable of being moved from end to end of the bale and to place the straps S completely about the bale and secure their ends together by means of compression type seals.

My invention comprises the process of carrying out the aforesaid steps in order to save time during the baling of fibers. Thus, and as shown in FIG. 1 the strapping device 16 first places a strap 17a adjacent one end of the bale and then moves to the far end of the bale for the placement of the next strap indicated at 17b.

Figure 1:
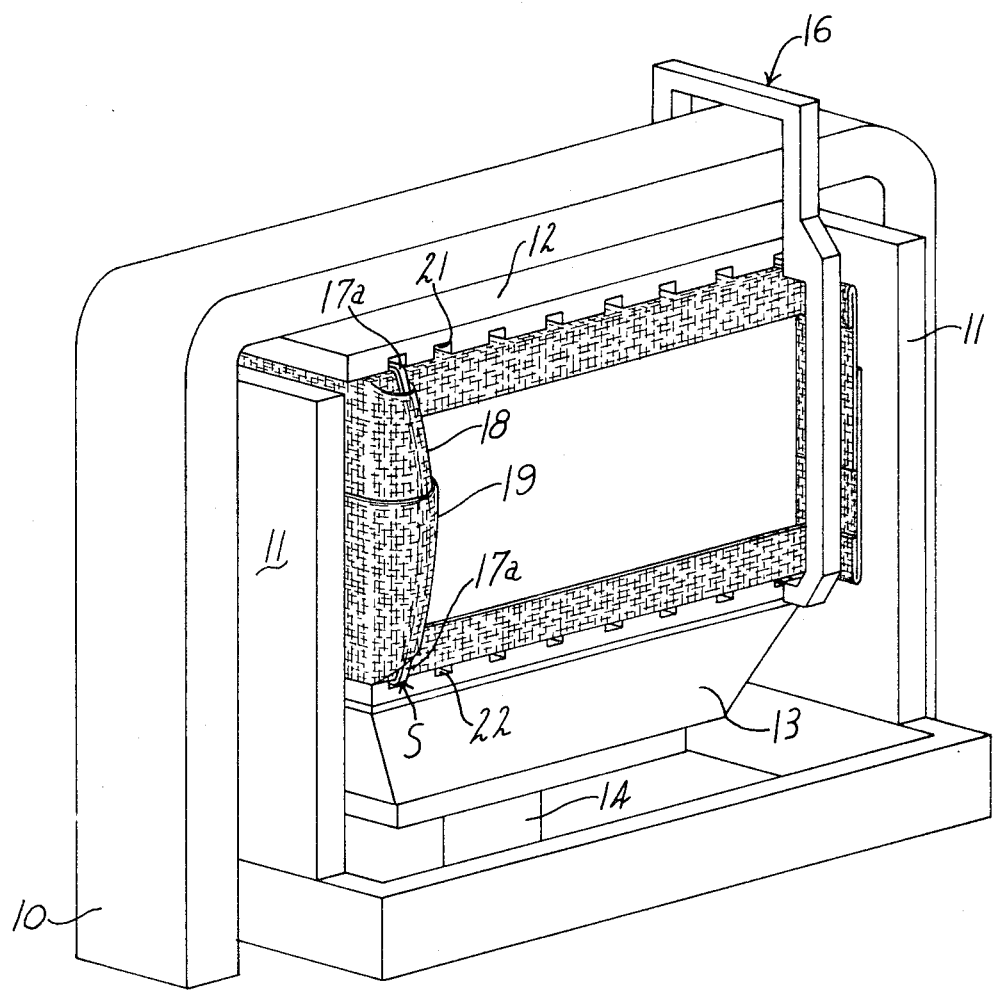
FIG. 1 is a wholly diagrammatic view of a baling press with a bale of fibers therein under compression and with the bagging wrapped about the bale having been tucked under one of the end straps.

With the strap 17a placed about the bale the operator or operators, (if there be an operator working each side of the bale) gathers up the bagging material 18 and 19, the separate sheets of which were drapped about the upper platen 12 and lower platen 13 prior to formation of the bale in the manner well known, and tucks them under the rather loosely disposed strap 17a as shown in FIG. 1. This operation is carried out while the strapping apparatus 16 is now at the far end of the bale placing strap 17b about the bale. As soon as the operator finishes tucking the bagging about strap 17a he or they, as the case may be, moves to the opposite end of the bale and as soon as the strap 17b is in place he commences tucking the bagging around that strap as indicated in FIG. 2. During all of this time the strapping machine is placing the subsequent or intermediate straps as indicated at 17c, 17d, 17e, etc. By the time the machine 16 has completed placing all the straps about the bale the tucking operation will be finished at the far end, whereby the operators do not have to wait for the strapping machine 17 to traverse from the end where strap 17a was placed to the end where 17b was placed, thus saving a considerable amount of time in the cycle.

While I have described the placement of a single strap 17a or 17b at the ends, under some circumstances it may be more desirable in order to more flatly pack the bagging to turn the same under a pair of straps at each end. Thus, if this were desired the machine would place the strap 17a thence place another strap through the guides 21 and 22, FIG. 1, before proceeding to the far end of the bale. After reaching the far end instead of placing a single strap 17b at that end the machine might place 17b and 17c under which the bagging 18 and 19 would be tucked, before proceeding with the placement of the intermediate straps.

As soon as the platen 13 is lowered the bale tends to expand in the vertical direction as indicated in the drawings, thus tightening the straps and trapping the bagging thereunder as illustrated in FIG. 4.

In view of the foregoing it will be seen that I have devised an improved process which greatly facilitates the wrapping and strapping of bales of fibers and the like in the sense of saving a considerable amount of time in the overall cycle. In actual practice my invention has proven to be extremely satisfactory and even where one operator is employed to tuck both sides of the bagging, the method described herein still saves a considerable amount of time because the operator can walk completely around the pressbox and tuck the bagging under both sides of the straps 17a and 17b before the machine 16 finishes its complete strapping cycle. This is particularly true where some total of six to ten straps to the bale are employed. When using two operators to tuck in the material the sequencing of the apparatus 16 can be speeded up, thus saving even more time.

While I refer herein to the tying material as being "straps" and illustrate them as flat bands of metal, I use the term to include various other forms of ties such as wires and the like. Also, "bagging" and "wrapping material" are intended to include various materials such as sheets of "plastic" material as well as jute.

While I have shown my invention in but one form, it will be obvious to those skilled in the art that it is not so limited, but is susceptible of various other changes and modifications without departing from the spirit thereof.

What I claim is:

1. The process of securing wrapping material about bales of fibers while under compression in a press or the like comprising:
   a. securing at least one strap about the bale adjacent one end thereof,
   b. subsequent to the step set forth in (a) above securing at least one strap about the bale adjacent the opposite end thereof,
   c. tucking the wrapping material about the first applied strap,
   d. tucking the wrapping material about the second applied strap,
   e. securing intermediate straps about the bale, and
   f. releasing the pressure on the bale whereby the bale expands thus to tighten said straps.

2. The process of claim 1 in which the intermediate straps are applied while the wrapping is being tucked about the said second applied strap.

3. The process of securing wrapping material about bales of fibers and the like while under compression comprising:
   a. securing bands about the bale in sequence with a traversing banding machine,
   b. said sequence being that at least one intermediate band is secured after the bands at either end of the bale have been secured, and
   c. tucking the wrapping material about the end bands.

4. The process of securing wrapping material about bales of fibers in a baling press comprising:
   a. securing bands about the bale in sequence with a traversing banding machine,
   b. said sequence being first to secure at least one band at one end of the bale,
   c. said sequence being such that at least one intermediate band is secured after bands at both ends of bale have been secured, and
   d. tucking said wrapping material about the end bands.

* * * * *